United States Patent
Strassner

(10) Patent No.: US 9,450,895 B2
(45) Date of Patent: Sep. 20, 2016

(54) CONTEXT-AWARE DYNAMIC POLICY SELECTION FOR MESSAGING BEHAVIOR

(71) Applicant: Futurewei Technologies, Inc., Plano, TX (US)

(72) Inventor: John Charles Strassner, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 210 days.

(21) Appl. No.: 14/303,488

(22) Filed: Jun. 12, 2014

(65) Prior Publication Data

US 2015/0365358 A1   Dec. 17, 2015

(51) Int. Cl.
G06F 15/16 (2006.01)
H04L 12/58 (2006.01)

(52) U.S. Cl.
CPC .................................. *H04L 51/00* (2013.01)

(58) Field of Classification Search
None
See application file for complete search history.

(56) References Cited

U.S. PATENT DOCUMENTS

| | | |
|---|---|---|
| 7,464,145 B2 | 12/2008 | Strassner |
| 7,542,956 B2 | 6/2009 | Strassner et al. |
| 7,558,847 B2 | 7/2009 | Strassner |
| 8,010,650 B2 | 8/2011 | Strassner |
| 8,019,838 B2 | 9/2011 | Jiang et al. |
| 8,078,553 B2 | 12/2011 | Strassner et al. |
| 8,195,827 B2 | 6/2012 | Strassner |
| 8,327,414 B2 | 12/2012 | Strassner et al. |
| 2004/0230681 A1 | 11/2004 | Strassner et al. |
| 2006/0015625 A1 | 1/2006 | Ballinger et al. |
| 2007/0288419 A1 | 12/2007 | Strassner |
| 2007/0288467 A1 | 12/2007 | Strassner et al. |

(Continued)

FOREIGN PATENT DOCUMENTS

| | | |
|---|---|---|
| KR | 100642998 B1 | 10/2006 |
| WO | 2004008283 A2 | 1/2004 |

(Continued)

OTHER PUBLICATIONS

3GPP, 3rd Generation Partnership Project; Technical Specification Group Core Network and Terminals; Technical realization of the Short Message Service (SMS) (Release 12). 3GPP TS 23.040 V12.2.0 Technical Specification, (Dec. 2013), 209 pages.

(Continued)

*Primary Examiner* — Brian P Whipple
(74) *Attorney, Agent, or Firm* — Slater Matsil, LLP

(57) ABSTRACT

Messaging policies can be dynamically updated based on operations, administration, maintenance, and provisioning (OAMP) data generated by data plane entities of a messaging network. For example existing messaging policies may be dynamically modified based on OAMP data generated by message brokers and/or network elements (e.g., queues). As another example, new messaging policies may be dynamically created based on the OAMP data. As another example, an updated set of messaging policies may be selected from a pool of policies based on the OAMP data. Dynamically updating messaging policies can be achieved using information model processing frameworks, such as the next generation directory enabled networks (DEN-ng) model. Various events may trigger the creation of new messaging policies and metrics, such as adding new data plane entities and/or network elements to the network, receiving new messaging instructions, etc.

22 Claims, 13 Drawing Sheets

(56) References Cited

U.S. PATENT DOCUMENTS

| | | |
|---|---|---|
| 2008/0059613 A1 | 3/2008 | Strassner |
| 2008/0071714 A1 | 3/2008 | Menich et al. |
| 2008/0126287 A1 | 5/2008 | Cox et al. |
| 2008/0161941 A1 | 7/2008 | Strassner et al. |
| 2008/0162109 A1 | 7/2008 | Strassner et al. |
| 2008/0271022 A1 | 10/2008 | Strassner et al. |
| 2008/0271111 A1 | 10/2008 | Cox et al. |
| 2008/0291923 A1* | 11/2008 | Back ............ H04L 45/04 370/396 |
| 2008/0316972 A1 | 12/2008 | Shaheen |
| 2009/0164499 A1 | 6/2009 | Samudrala et al. |
| 2009/0165078 A1 | 6/2009 | Samudrala et al. |
| 2009/0327172 A1 | 12/2009 | Liu et al. |
| 2009/0328133 A1 | 12/2009 | Strassner et al. |
| 2013/0054809 A1 | 2/2013 | Urmanov et al. |
| 2015/0281339 A1* | 10/2015 | Strassner ........ H04L 43/0888 709/224 |
| 2015/0304234 A1* | 10/2015 | Salle ............ G06F 7/00 709/226 |

FOREIGN PATENT DOCUMENTS

| | | | |
|---|---|---|---|
| WO | 2007143259 | A2 | 12/2007 |
| WO | 2007146463 | A2 | 12/2007 |
| WO | 2008024539 | A2 | 2/2008 |
| WO | 2008082763 | A2 | 7/2008 |
| WO | 2008082771 | A1 | 7/2008 |
| WO | 2008134273 | A1 | 11/2008 |
| WO | 2009002697 | A1 | 12/2008 |
| WO | 2009158462 | A2 | 12/2009 |

OTHER PUBLICATIONS

Desai, J., et al., "Architecting OSB for High Availability and Whole Server Miration," Oct. 2009, 49 pages.
IBM, "Load Balance Administration Guide," WebSphere Application Server, Version 6.1, IBM Corp., May 2006, 501 pages.
IBM, "Load Balancing IBM WebSphere Servers with F5 Networks BIG-IP System," (date unknown), 15 pages.
"Quick Start Guide," Apache ServiceMix, Version 5.0.0-SNAP-SHOT, Retrieved Nov. 2012, 14 pages.
Red Hat, "JBoss Fuse Apache CXF Development Guide (Draft)," Version 6.1, Dec. 2013, 760 pages.
TIBCO, "TIBCO Administrator Server Configuration Guide," Software Release 5.7.1, Mar. 2012, 297 pages.
International Search Report and Written Opinion received in International Application No. PCT/CN2015/075003 mailed Jun. 17, 2015, 12 pages.

* cited by examiner

|  | IBM WebSphere MQ | Vmware RabitMQ | Apache ActiveMQ | JBOSS HornetQ | Tibco Rendazvous | Embodiment |
|---|---|---|---|---|---|---|
| STATIC SYSTEM METRIC CONFIGURATION, SUCH AS QUEUE SIZE, TTL, AND ETC | ✓ | ✓ | ✓ | ✓ | ✓ | ✓ |
| METRICS FOR DETERMINING SYSTEM INTERNAL ALGORITHM CAN BE CHOSEN DYNAMICALLY |  |  |  |  |  | ✓ |
| POLICY-BASED CONTROL TO DYNAMICALLY ADJUST METRICS |  |  |  |  |  | ✓ |
| EXTENSIBLE METRICS (FREE TO ADD NEW OR EDIT EXISTING METRICS) |  |  |  |  |  | ✓ |

FIG. 14

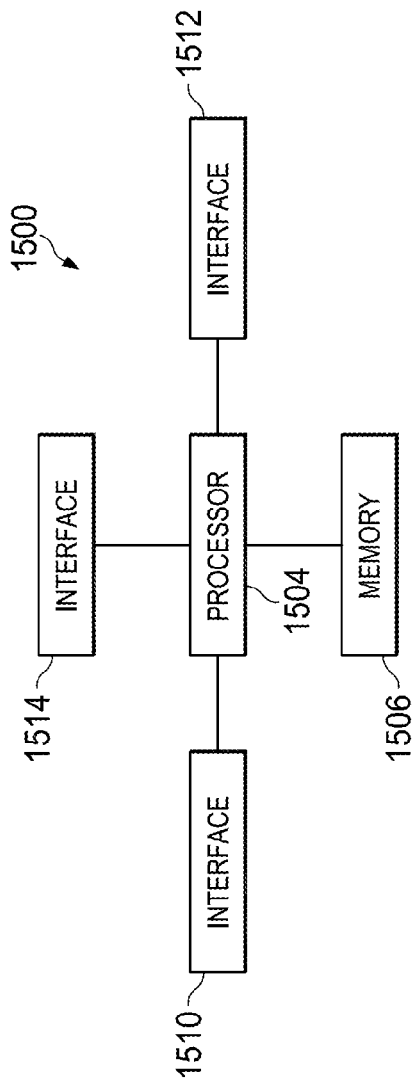

FIG. 15

CONTEXT-AWARE DYNAMIC POLICY SELECTION FOR MESSAGING BEHAVIOR

CROSS-REFERENCE TO RELATED APPLICATIONS

This patent application is related to U.S. patent application Ser. No. 14/229,640 filed on Mar. 28, 2014 and entitled "Context-Aware Dynamic Policy Selection for Load Balancing Behavior entitled," which is incorporated by reference herein as if reproduced in its entirety.

TECHNICAL FIELD

The present invention relates generally to messaging services, and in particular embodiments, to context-aware dynamic policy selection to control messaging behavior.

BACKGROUND

Modern communications networks often provide users with some form of messaging service. One type of messaging service offered by modern communications networks is Short Message Service (SMS), which is a service component of phone, web, or mobile communication systems that allows fixed line or mobile phone devices to exchange short text messages. Another type of messaging service offered by modern communications networks is Enhanced Messaging Service (EMS), which is an extension to SMS that allows users to send and receive messages that have special text formatting (such as bold or italic), animations, icons, sound effects and special ring tones. Yet another type of messaging service offered by modern communications networks is Multimedia Messaging Service (MMS), which is an extension to SMS that allows users to send photographs and videos. SMS, EMS, and MMS communication protocols are defined by third generation partnership project (3GPP) technical specification (TS) 23.040, which is incorporated herein by reference as if reproduced in its entirety.

Conventional techniques for managing and providing messaging services rely on static messaging-related metrics and policies. For example, traditional techniques may define a static time to live (TTL) for a connection. Relying on static metrics and policies may be ill-suited for large-scale and/or multi-tenancy platforms, such as data centers and cloud computing, because the requirements and constraints of the messaging environment change dynamically. Accordingly, flexible, scalable, and customizable management and control mechanisms are needed to provide efficient and robust messaging services for diverse applications.

SUMMARY OF THE INVENTION

Technical advantages are generally achieved, by embodiments of this disclosure which describe context-aware dynamic policy selection for messaging behavior.

In accordance with an embodiment, a method for dynamically adjusting messaging behavior is provided. In this example, the method includes instructing a messaging broker in a communications network to provide messaging services to users in accordance with an initial set of policies during a first period, obtaining operations, administration, maintenance, and provisioning (OAMP) data from a messaging system being managed, and distributing the OAMP data to entities in a management system using the messaging services provided during the first period. The method further includes obtaining an updated set of policies in accordance with the OAMP data collected, the updated set of policies reflecting the nature of the OAMP data collected, and instructing the messaging broker to provide messaging services between the management system and the messaging system in accordance with the updated set of policies during a second period. An apparatus for performing this method is also provided.

In accordance with another embodiment, a device configured to provide message-oriented middleware functionality in a communications network is provided. In this example, the device includes a rule repository configured to store a pool of messaging policies, a messaging broker configured to process transmitted messages into received messages in accordance with a set of messaging policies during a first period, and a plurality of messaging queues. The transmitted messages are communicated from sending devices, and the received messages configured to be communicated to recipient devices. The plurality of messaging queues are configured to store the received messages prior to the received messages being communicated to the recipient devices. The device further includes a context-aware policy manager configured to dynamically update the set of messaging policies in accordance with operations, administration, maintenance, and provisioning (OAMP) data generated by the messaging broker, the messaging queues, or both during the first period.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 14 illustrates a chart for comparing embodiment messaging solutions with conventional solutions; and FIG. 15 illustrates a diagram of an embodiment device for performing techniques of this disclosure.

Corresponding numerals and symbols in the different figures generally refer to corresponding parts unless other-

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are techniques for dynamically updating messaging policies based on operations, administration, maintenance, and provisioning (OAMP) data generated by data plane entities of a messaging network. In some embodiments, existing messaging policies are dynamically modified based on OAMP data generated by message brokers and/or network elements (e.g., queues). In other embodiments, new messaging policies are dynamically created based on the OAMP data. In yet other embodiments, an updated set of messaging policies are selected from a pool of policies based on OAMP data. Dynamically updating messaging policies can be achieved using information model processing frameworks, such as the next generation directory enabled networks (DEN-ng) model. Indeed, aspects of this disclosure provide an extension to the DEN-ng model that allows new messaging policies and metrics to be dynamically defined. Various events may trigger the creation of new messaging policies and metrics, such as adding new data plane entities and/or network elements to the network, receiving new messaging instructions, etc. These and other aspects are described in greater detail below.

Figure 1:
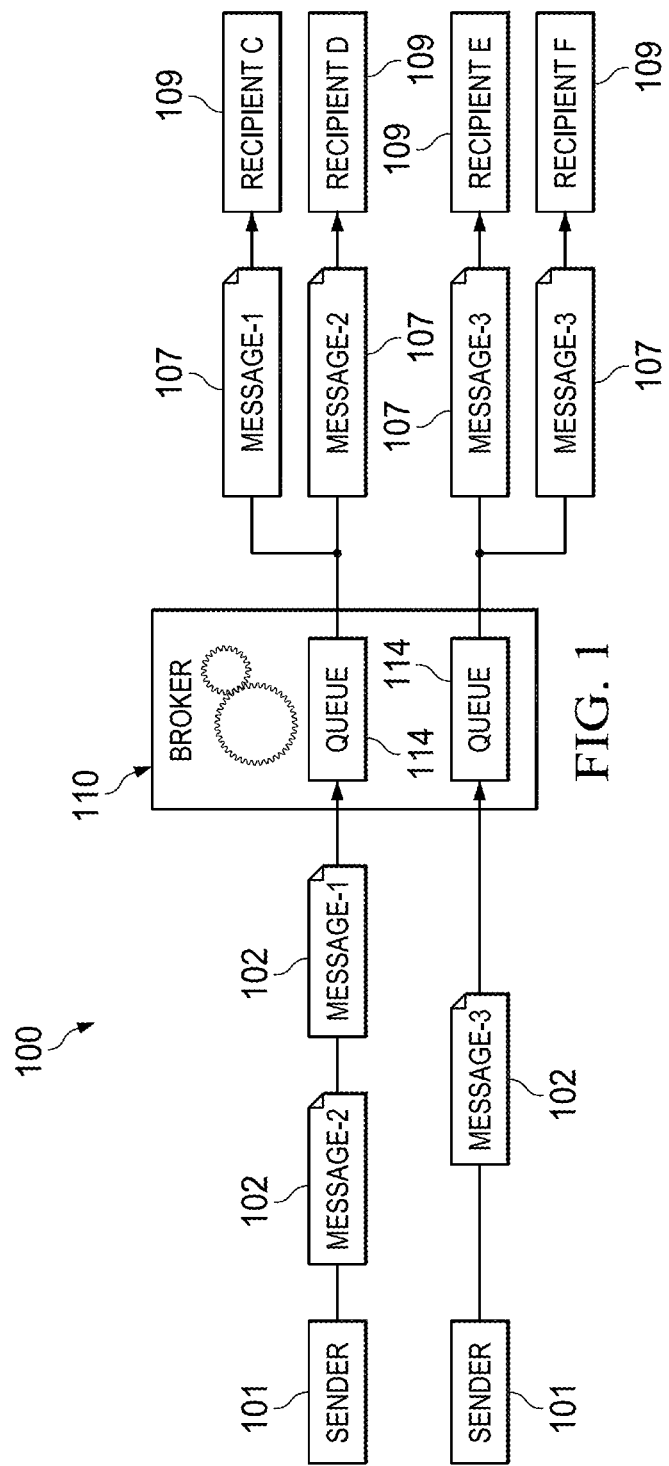
FIG. 1 illustrates a diagram of a communications network.

FIG. 1 illustrates a communications network 100 for supporting messaging between client devices. As shown, the communications network 100 comprises senders 101, a message broker 110, and recipients 109. The senders 101 communicated messages 102 to the message broker 110. Some of the messages 102 may be unicast messages (e.g., message-1, message-2, etc.), while others may be multicast messages (e.g., message-3). The messages 102 may have various different formats prior to being received by the message broker 110. The message broker 110 may convert the messages 102 into processed messages 107 that have a format that is understood by the recipients 109. The processed messages 107 may be stored in queues prior to being transmitted to the recipients 109.

Figure 2:
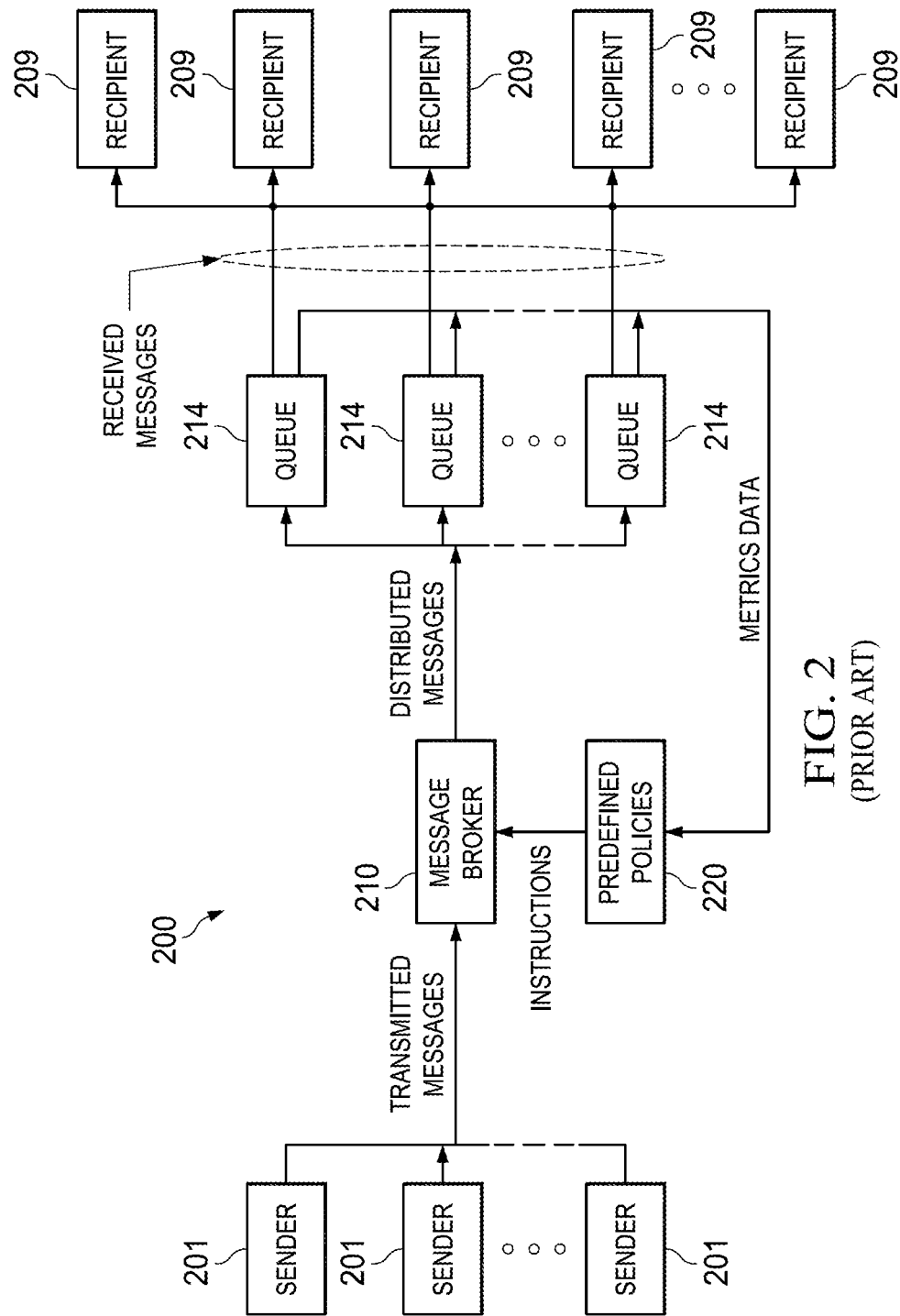
FIG. 2 illustrates a diagram of a conventional messaging network.

Traditional messaging networks process and/or store messages in queues based on statically pre-defined policies. FIG. 2 illustrates a conventional messaging network 200 comprising senders 201, a message broker 210, and recipients 209. The message broker 210 receives transmitted messages from the senders 201, processes the transmitted messages into received messages (e.g., messages having a format that is capable of being understood by the recipients 209), and distributes the received messages into queues 214 in accordance with instructions provided by the statically defined policies 220. The statically defined policies 220 may govern various parameters of the conventional messaging network 200 as a function of performance metrics of the queues 214. For example, the statically defined policies 220 may govern time-to-live parameters for communications sessions between a sender 201 and a recipient 209. In an embodiment, a time to live (TTL) parameter is a mechanism that limits the lifespan of a connection. In another embodiment, a TTL parameter is a mechanism that limits the length of time data is stored in a buffer to prevent a data packet from circulating indefinitely in a messaging network, to improve caching performance, and/or to enhance privacy. Other parameters governed by the statically defined policies 220 include health parameters (e.g., CPU and memory utilization) that indicate problems in the infrastructure, as well as performance and fault information (e.g., alarms, input and output packets and flows received and sent, and number of database reads and writes) that needs to be transmitted to the management system(s) in order to be remediated. One problem with this static approach is that the application developer may need to anticipate, at design time, the set of information that must be monitored, as well as the policy rules for solving the anticipated problems. This may be difficult for dynamic systems that change at runtime.

For example, the statically defined policies 220 may specify that (1) if all the queues 214 have free buffer capacity (e.g., unused space available for storing new messages), then the messages are to be equally distributed amongst the statically defined queues; and (2) if one of the queues 214 becomes overloaded (e.g., received messages exceeds a pre-defined threshold), then a percentage of message distributions can be shifted from the overloaded server to the set of other queues whose buffers are below their pre-defined thresholds at a given rate until the overloaded queues is no longer overloaded.

Notably, while operation of the messaging broker 210 may vary based on performance metrics, the statically-defined policies 220 remain unchanged during runtime operation of the conventional messaging network 200. This may be dis-advantageous for a variety of reasons, as the pre-defined policies 220 may be incapable of reacting to changing demands, thereby failing to deliver required services and/or optimize the processing of existing services, projecting contingencies, and/or may be unable to account for new needs of the network 200. For example, the statically defined policies 220 may not account for a situation in which all of the queues 214 become overloaded, or if new traffic is received that requires special processing. In addition, the statically defined policies 220 may not account for changes traffic patterns or types of faults that disrupt services.

Figure 3:
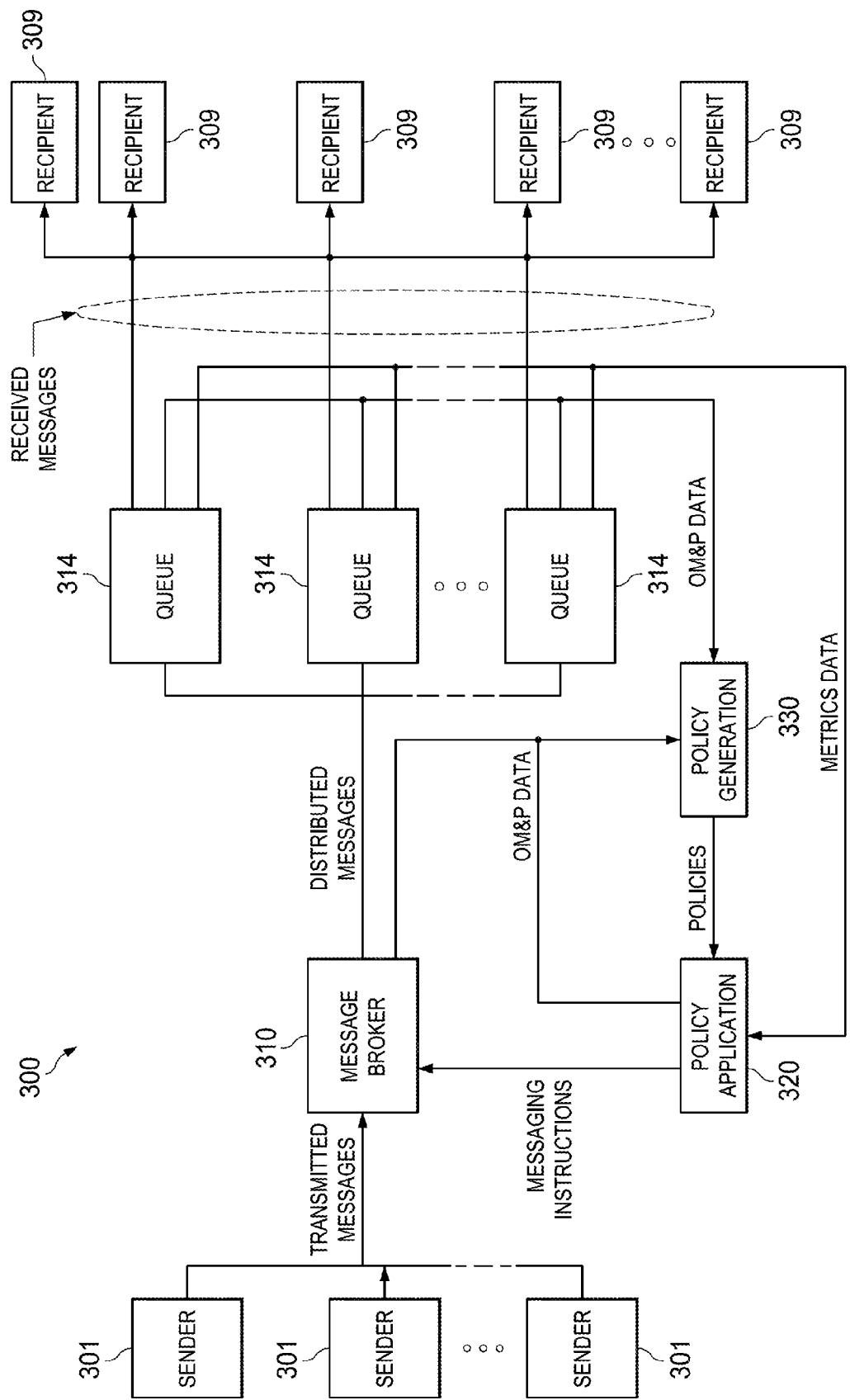
FIG. 3 illustrates a diagram of an embodiment messaging network.

Aspects of this disclosure allow the generation of new policies based on OAMP data obtained from messaging broker and/or network elements (e.g., queues, etc.). In particular, aspects of this disclosure provide a closed-loop control system that adjusts the messaging behavior based on OAMP data received from the infrastructure being managed. FIG. 3 illustrates an embodiment messaging network 300 in which a message broker 310 receives transmitted messages from senders 301, processes the transmitted messages and translates their format and content into received messages, and distributes the received messages to queues 314. The processing of the transmitted messages, as well as their distribution amongst the queues 314, may be performed by the message broker 310 based on messaging instructions received from a policy application module 320. The messaging instructions may be derived from dynamically defined policies communicated from the policy generation module 330 to the policy application module 320. The policy application module 320 may apply the policies as a function of performance and other metrics obtained from the queues 314. Moreover, the policies themselves may be dynamically created by the policy generation module 330 based on OAMP data generated by the message broker 310 and/or the queues 314. This allows both the messaging behavior, as well as the policies that govern that behavior, to be dynamically adjusted to suit changing network conditions. The queues 314 may send the received messages to the recipients 309 based on queuing policies (e.g., first-in-first out, weighted priority, etc.). While not depicted in FIG. 3, the queuing policies may also be generated by the policy generation module 330 in accordance with the OAMP data.

Figure 4:
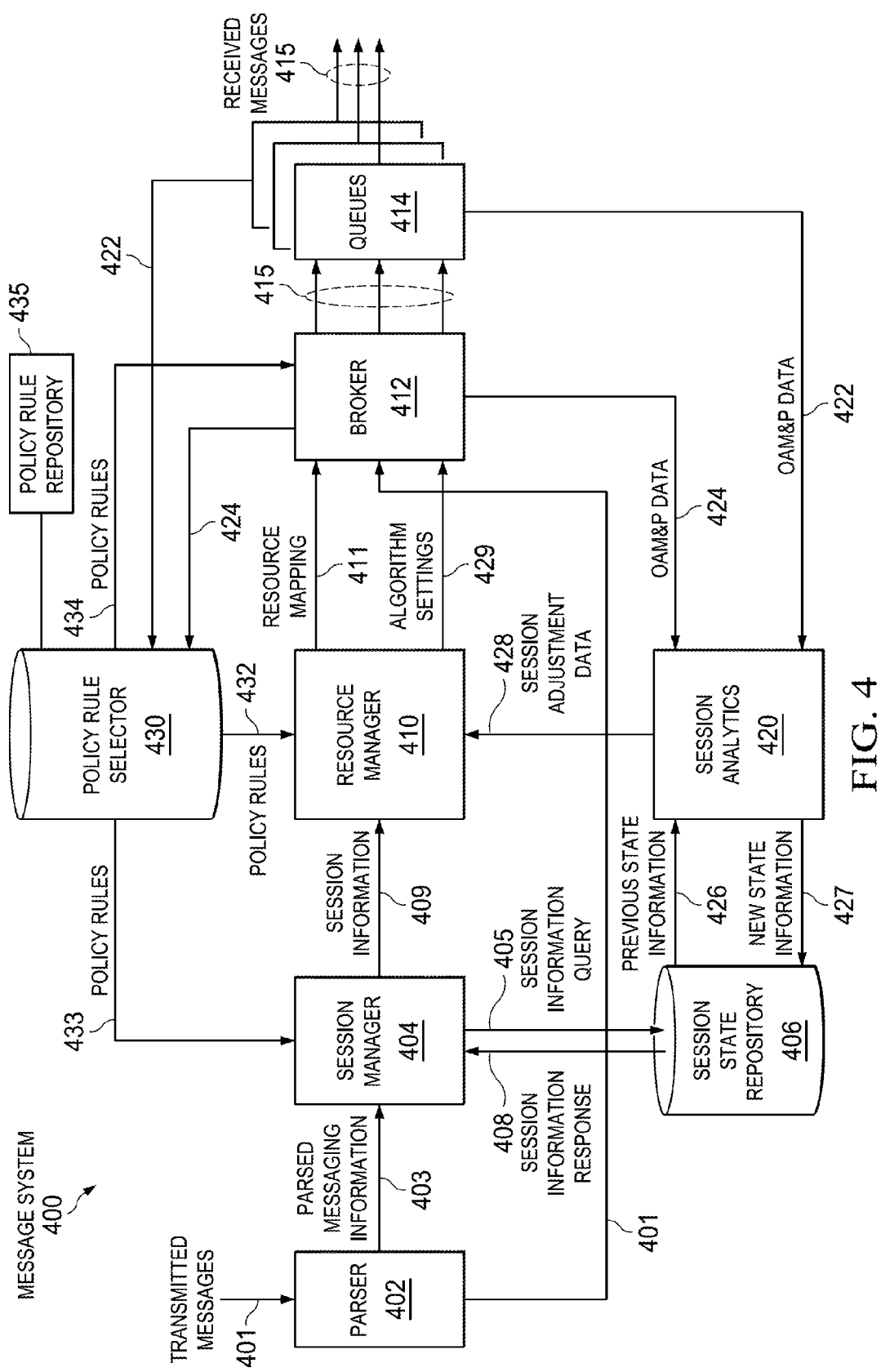
FIG. 4 illustrates a diagram of another embodiment communications network.

FIG. 4 illustrates another embodiment of the messaging network 400. As shown, transmitted messages 401 are parsed by a parser 402 prior to being forwarded to a messaging broker 412. The messaging broker 412 processes the transmitted messages into received messages 415, which are distributed amongst the queues 414 prior to being forwarded to their recipients. The manner in which the transmitted messages 401 are processed and distributed by the messaging broker 412 is controlled by policies and adjustments provided by the messaging system 400.

Specifically, the parser 402 analyzes the transmitted messages 401 to obtain parsed message information 403, which is forwarded to the session manager 404. The parser 402 may use various techniques for parsing the transmitted messages 401. In one embodiment, the parser 402 uses a markup language (e.g., Extensible Markup Language (XML)) to map the transmitted messages 401 into parsed messaging information 403. Other computer-oriented languages can also be used to generate the parsed messaging information 403, such as Knowledge Interchange Format (KIF) language, etc. In these and other cases, the language can serve a number of different functions, including representing business policies, model elements from the information model and objects from the data model(s), and even OAMP data. This facilitates the calculation and processing of, for example, remediation actions.

The Session Manager 404 examines the parsed messaging information 403 to determine whether the transmitted message 401 belongs to an existing communications session, in which case parameters associated with the existing communications session can be utilized to more efficiently process and/or distribute the corresponding transmitted message 401. Specifically, the session manager 404 may send a session information query to a session state repository 406 that includes information relating to session information of the transmitted message 401. The session state repository 406 may return a session information response 408 to the session manager 404 specifying whether or not the transmitted message 401 is associated with an existing session, and if so, identification information for the associated existing session. As noted above, determining whether a transmitted message 401 is associated with an existing session can allow more efficient and/or streamlined processing/distribution of the transmitted message 401. For example, it may be beneficial (from a network perspective) to process messages associated with the same session in a similar manner (e.g., apply same quality of service (QoS) restriction, etc.,) and/or store those message in the same queue 414.

The session manager 404 then sends session information 409 to the resource manager 410. The session information 409 may indicate various information relating to the transmitted message 401, including (for example) whether the transmitted message 401 is associated with an existing session, etc. The resource manager 410 then creates a new session for the transmitted message 401, or otherwise associates the transmitted message 401 with an existing session, and proceeds to map the transmitted message 401 to one or more messaging brokers 412 using a mapping algorithm. This mapping is communicated to the messaging brokers 412 via the resource mapping instructions 411. The corresponding messaging broker 412 then distributes the transmitted message 401 to one or more queues 414 based on policy rules 434 and algorithm settings 429 provided by the policy rule selector 430 and the resource manager 410, respectively.

Notably, the policy rules 432-434 govern operations of the resource manager 410, session manager 404, and the messaging brokers 412, respectively. The policy rule selector 430 selects the policy rules 432-434 from a policy rule repository 435 based on Operational, Administrative, Management, and Performance (OAMP) data 422, 424 collected from the queues 414 and the messaging brokers 412. Different amounts and/or types of OAMP data 422, 424 may be collected from different queues 414 and/or messaging brokers 412. In some embodiments, a DEN-ng model is used to define how each of the collected OAMP data types relates to one another, as well as to customers and applications. The OAMP data 422, 424 is also analyzed by the session analytics module 420, which tracks current loading data for each of the queues 414 and messaging brokers 412. The session analytics module 420 uses the OAMP data 422, 424, along with previous state information 426 from the session state repository 406, to produce new state information 427 and session adjustment data 428. The new state information 427 is inferred or derived from the OAMP data 422, 424, and is used to update previous state information in the session state repository 406. The session adjustment data 428 can include various data (e.g., existing data, time-sensitive data, etc.) and/or guidelines that are used by the resource manager 410 to adjust settings of messaging broker algorithms, which is achieved through communication of the algorithm settings 429. In some embodiments, the resource manager 410 adjusts the algorithms in order to balance workloads of different clients (e.g., senders, recipients, etc.) as a function of the client's context. For example, the algorithm settings 429 may change queue parameters or introduce a new type of queue or scheduler.

The policy rules 432, 433, and 434 may be adjusted dynamically (e.g, the actions that they take, and/or the entities that they apply to, may be changed at runtime) in order to adapt the behaviors of the resource manager 410, session manager 404, and messaging broker 412 according to a current context. Advantageously, this allows global or local system objectives to be translated into policies that define messaging behavior and coordinate operations of the resource manager 410, session manager 404, and messaging brokers 412, thereby improving overall network performance through, inter alia, synchronization of the resource manager 410, session manager 404, and messaging brokers 412.

In some implementations, two or more of the resource manager 410, session manager 404, and messaging brokers 412 will use different command languages and/or user interfaces. In such cases, context-aware policy selection techniques may use an information model system architecture (e.g., DEN-ng or otherwise) to map the syntax and semantics of the different commands to each other, which will offer increased interoperability and reduced translation related processing when compared to techniques relying on no model, or on data model architectures. Moreover, implementation of the information model system architecture may allow capabilities of the resource manager 410, session manager 404, and messaging broker 412 to be mapped to system-wide objectives, thereby allowing high-level technology/vendor neutral goals to be translated into lower-level vendor-specific commands.

Figure 5:
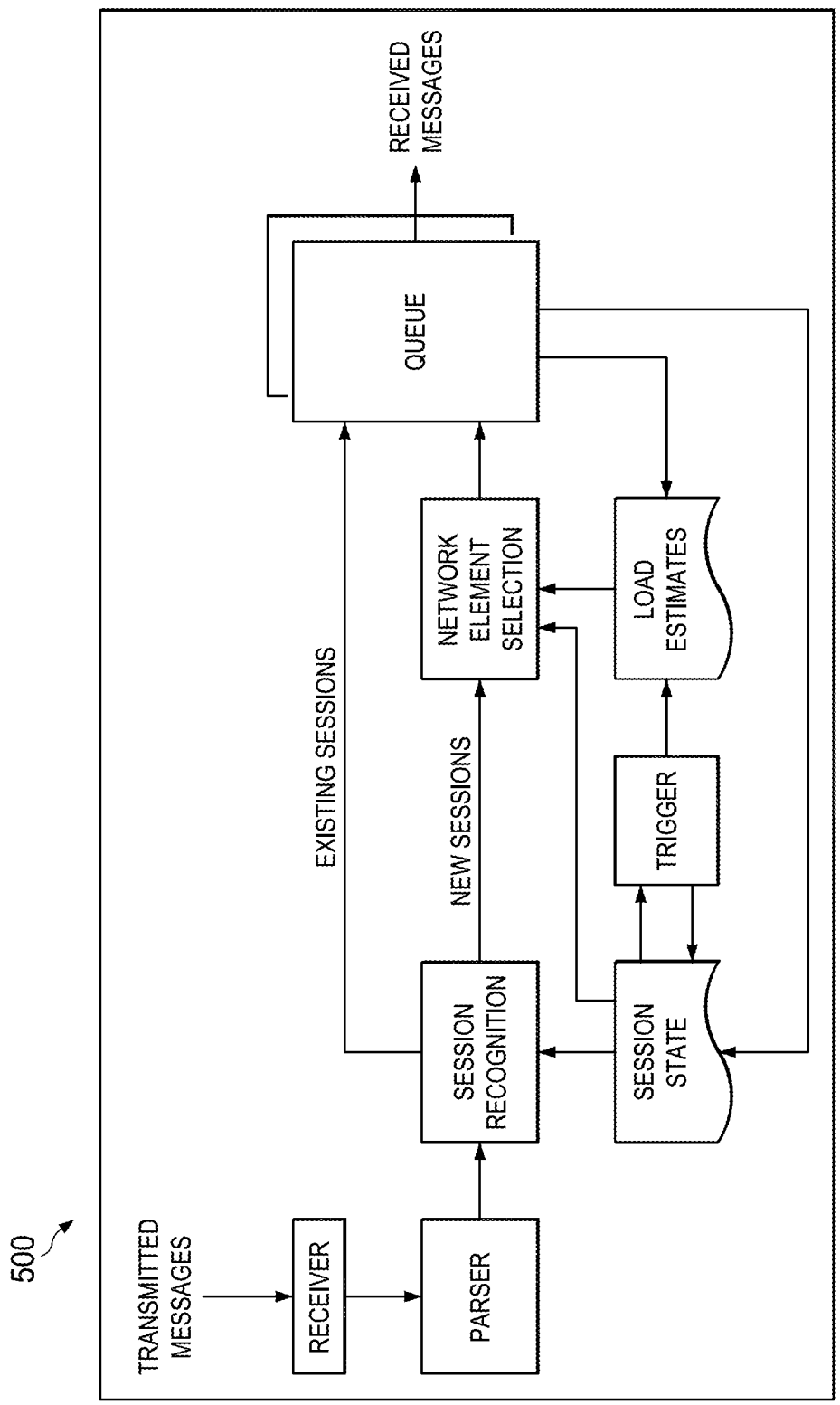
FIG. 5 illustrates a diagram of a workflow for an embodiment communications network.

FIG. 5 illustrates a workflow 500 of the messaging architecture 400. As shown, a transmitted message is parsed and analyzed in order to determine whether the message is associated with an existing session based on session state information. If the message is associated with an existing session, then the message can be handled using parameters corresponding to the existing session. For instance, the new message may be distributed to a queue assigned to process previous messages of the existing session. Conversely, if the message is not associated with an existing session, then a new session is created, and the messaging network selects processing and/or distribution settings for the new session. The messaging settings include message mapping guidelines based on processing load and/or congestion estimations for the system being managed, e.g., processing costs, bandwidth costs, etc. The message is then processed and distributed to the queues in accordance with messaging settings prior to being communicated to the intended recipient(s).

Figure 6:
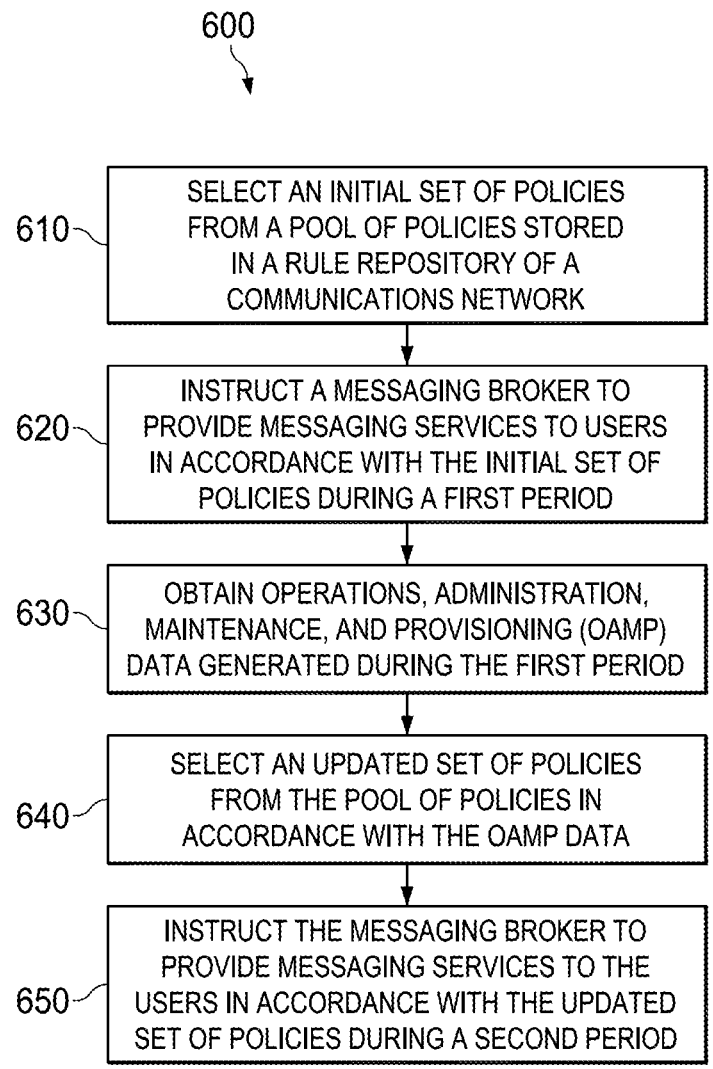
FIG. 6 illustrates a flowchart of an embodiment method for providing messaging in a communications network.

Aspects of this disclosure provide techniques for dynamically adjusting messaging behavior based on OAMP data. FIG. 6 illustrates a method 600 for adjusting messaging behavior, as may be performed by a context-aware policy manager. As shown, the method 600 begins with step 610, where context-aware policy manager selects an initial set of policies from a pool of policy rules that are stored in a rule repository of a messaging network. Subsequently, the method 600 proceeds to step 620, where the context-aware policy manager instructs message brokers to provide messaging services (e.g., process messages received from senders, distribute the processed messages amongst queues, etc.) in accordance with the initial set of policies during a first period. Next, the method 600 proceeds to step 630, where the context-aware policy manager obtains OAMP data generated during the first period. The OAMP data may be generated by the network and sent to the message brokers, queues, or both. Thereafter, the method 600 proceeds to step 640, where the context-aware policy manager selects an updated set of policies from the pool of resource policies that use the information provided by the OAMP data. Subsequently, the method 600 proceeds to step 650, where the context-aware policy manager instructs the message brokers to provide messaging services in accordance with the updated set of policies during a second period. In some embodiments, the initial set of policies, and the updated set of policies, may include queuing policies that are communicated to queues. The queuing policies may govern how the queues prioritize messages during the buffering stage. It should be noted that this represents a closed control loop, wherein changes in the system being managed can be represented through the OAMP data, and the updated set of policies represent existing and/or changed rules that govern how messages should be constructed and distributed in order to change the system configuration.

Messaging techniques described herein can use information model and data model frameworks to achieve context-aware policy selection. Information models typically use a set of abstractions to model entities in a managed environment, and can define relationships between entity attributes and operations based on policy rules, which can be selected based on a context of the entity or system. One advantage of an information model is that policy rules, customers, devices, and OAMP data can all be represented in a single model in a technology- and vendor-neutral manner. Comparatively, a data model is a concrete implementation of an information model in terms appropriate to a specific type of repository that uses a specific access protocol or protocols. The data model can include data structures, operations, and rules that define how the data is stored, accessed and manipulated. In addition, the advantage of using information model frameworks is that multiple data models can be harmonized by defining the terminology, concepts, and data of the information model to be the "master data". As such, the master data can be used to harmonize and reconcile differences in definition, format, and other aspects of different data models that are describing the same or similar concepts.

Figure 7:
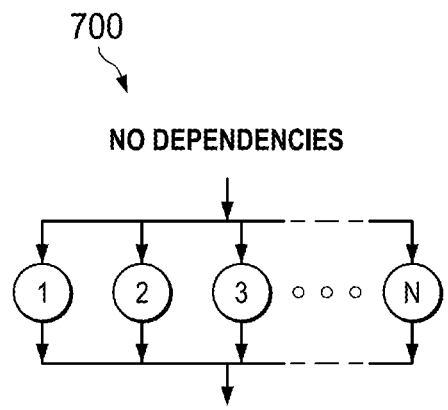
FIG. 7 illustrates a graph of independent network elements.

In some messaging networks, network elements (e.g., message brokers, queues, etc.) may operate independently, and consequently may not share any dependencies. FIG. 7 illustrates a graph of a messaging network comprising network elements that share no dependencies. More often, however, network elements perform related processing tasks, and as a result, the operation of one network element is dependent on the operation of another network element. By way of example, a system including a message broker and queue may require that the message broker finish processing a transmitted message prior to the message being stored in the queue and/or forwarded from the queue to a recipient. Hence, the queue's performance is dependent on the message broker's processing of the transmitted message, and is consequently affected by, inter alia, message broker's processing efficiency. As another example, a system including a storage, memory, and processors may require that a programming instruction be read from storage into memory before the processor can perform a given task. Hence, the processor's performance of tasks is dependent on reading the programming instruction for the storage to the memory, and is consequently affected by, inter alia, efficiency of storage and memory operations, e.g., time required to find the instruction in storage database, etc. This relationship may be referred to as a "must finish first" dependency, where processing at one element must be completed before processing at a second node can begin. Must finish first dependencies are typically demonstrated by an arrow from the first node to the second node.

Figure 8A:
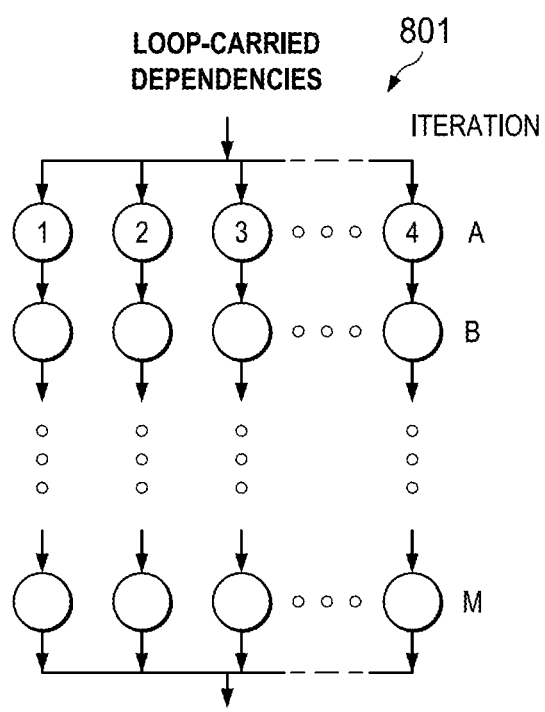
FIGS. 8A-8C illustrate graphs of dependencies between dependent network elements.
Figure 8B:
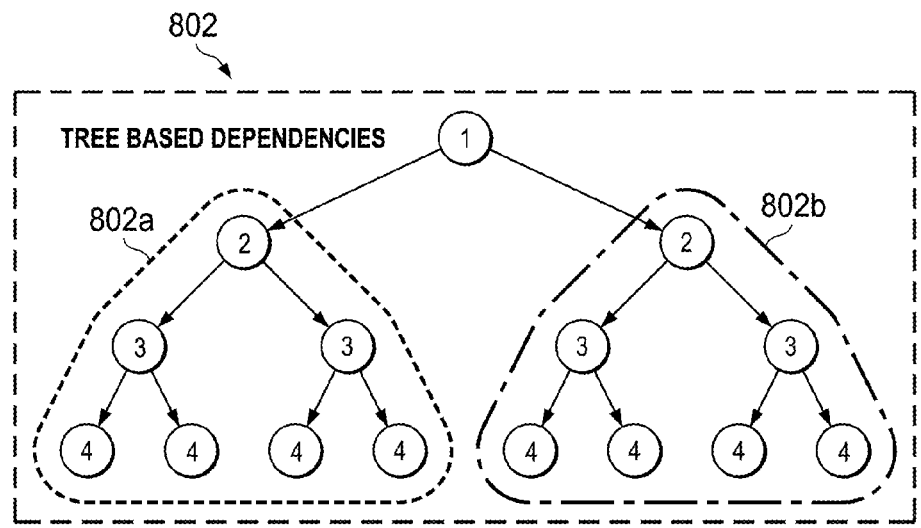
Figure 8C:
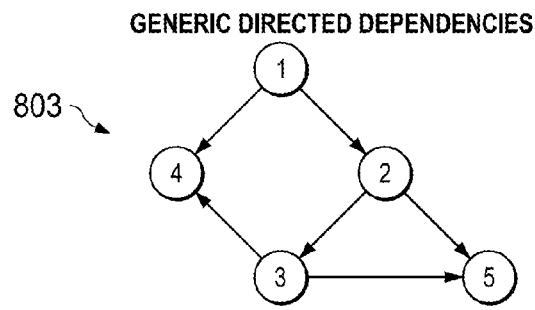

Aspects of this disclosure provide techniques for modeling dependency relationships between network elements of messaging network. FIGS. 8A-8C illustrate graphs of dependency relationships 801, 802, 803 between network elements in a messaging network. While other dependency relationships may exists, the dependency relationships 801, 802, 803 may account for approximately ninety percent of dependencies encountered in embodiment messaging networks. Each graph defines different ways that objects depend on each other. Typically, for each graph 801, 802, 803, nodes represent tasks, and edges represent dependencies. Dependency relationship 801 demonstrates a loop-carried dependency relationship, where dependencies are present within iterations of a task, but not between tasks. Dependency relationship 802 demonstrates a tree-based dependency relationship, where lower-tier tasks are dependent on higher tier tasks, but where tasks on a common tier can be performed independently. Consequently, sub-tree 802a can be performed in parallel with the sub-tree 802b. Dependency relationship 803 demonstrates a directed acyclic graph dependency relationship, where inter-dependent tasks are those tasks that do not have a directed dependency cycle. As shown, node 1 depends on nodes 2 and 4, node 2 depends on nodes 3 and 5, node 3 depends on nodes 4 and 5, and nodes 4 and 5 are terminal nodes.

Figure 9:
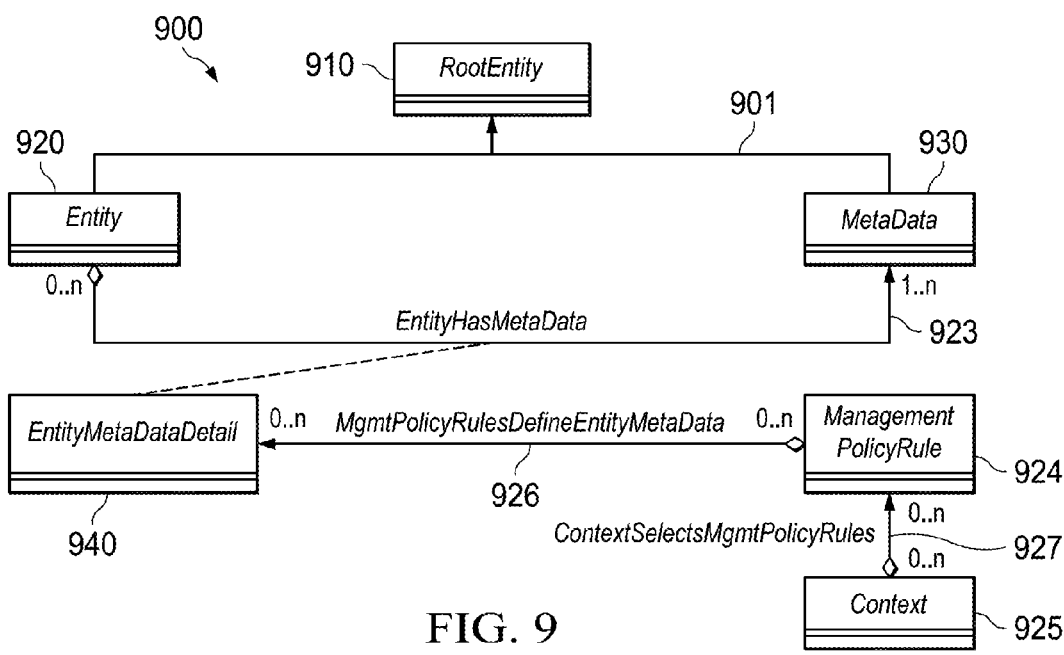
FIG. 9 illustrates a class diagram for relating entities to metadata using the DEN-ng model.

Aspects of this disclosure provide an extension to the DEN-ng policy information model that allows new policies and metrics to be dynamically defined. DEN-ng allows policy rules to be represented by various components, including metadata, event clauses, condition clauses, and action clauses. FIG. 9 illustrates a class diagram 900 for relating entities to metadata using the DEN-ng model. As shown, the class diagram 900 includes a root entity 910, an entity 920, and a metadata entity 930 which are interrelated via relationships. The root entity 910 is the top of the DEN-ng class hierarchy, and includes properties that enable naming, description, and identification of all objects (manageable and unmanageable) in the environment. Entity 920 and metadata 930 are subclasses of root entity 910, and are therefore related to root entity 910 via an inheritance relationship 901. According to the DEN-ng model, any subclass inherits the attributes and relationships of its superclass. For example, entity 920 and metadata 930 inherit the attributes and relationships of root entity 910. Entity 920 relates to metadata 930 via an aggregation relationship 923, which allows the entity 920 to be associated with all, or some portion, of the metadata 930. Which portion of the metadata 930 is associated with the entity 920 depends on the entitymetadatadetail association class 940, whose attributes define one or more constraints that define which metadata can be aggregated by which entities. The attributes of the entitymetadatadetail association class 940 are changed by a set of one or more ManagementPolicyRules 924; the applicable set of ManagementPolicyRules 924 that are applied at any given time are defined by the context 925. Thus, by manipulating the context 925, new policy rules can be implemented to control the relationship between entity 920 and metadata 930. Put another way, the aggregation 923 is more than a simple set of pointers that tells the system that Entity aggregates MetaData and MetaData is a part of Entity, but rather is realized as an association class that enables portions of different types of MetaData to be aggregated by the Entity for different contexts. An association class may allow the semantics of the aggregation to be defined by the entitymetadatadetail association class 940. Hence, the aggregation mgmtpolicyrulesdefineentitymetadata 926 can be used to change the values of attributes and/or relationships of the entitymetadatadetail association class 940 class based on changes in context. The attribute changes can be used to constrain which MetaData should be aggregated by which Entity. Note that the contextselectsmgmtpolicyrules aggregation 927 can be used to select the specific set of ManagementPolicyRules 924 that are appropriate for a particular context.

Figure 10:
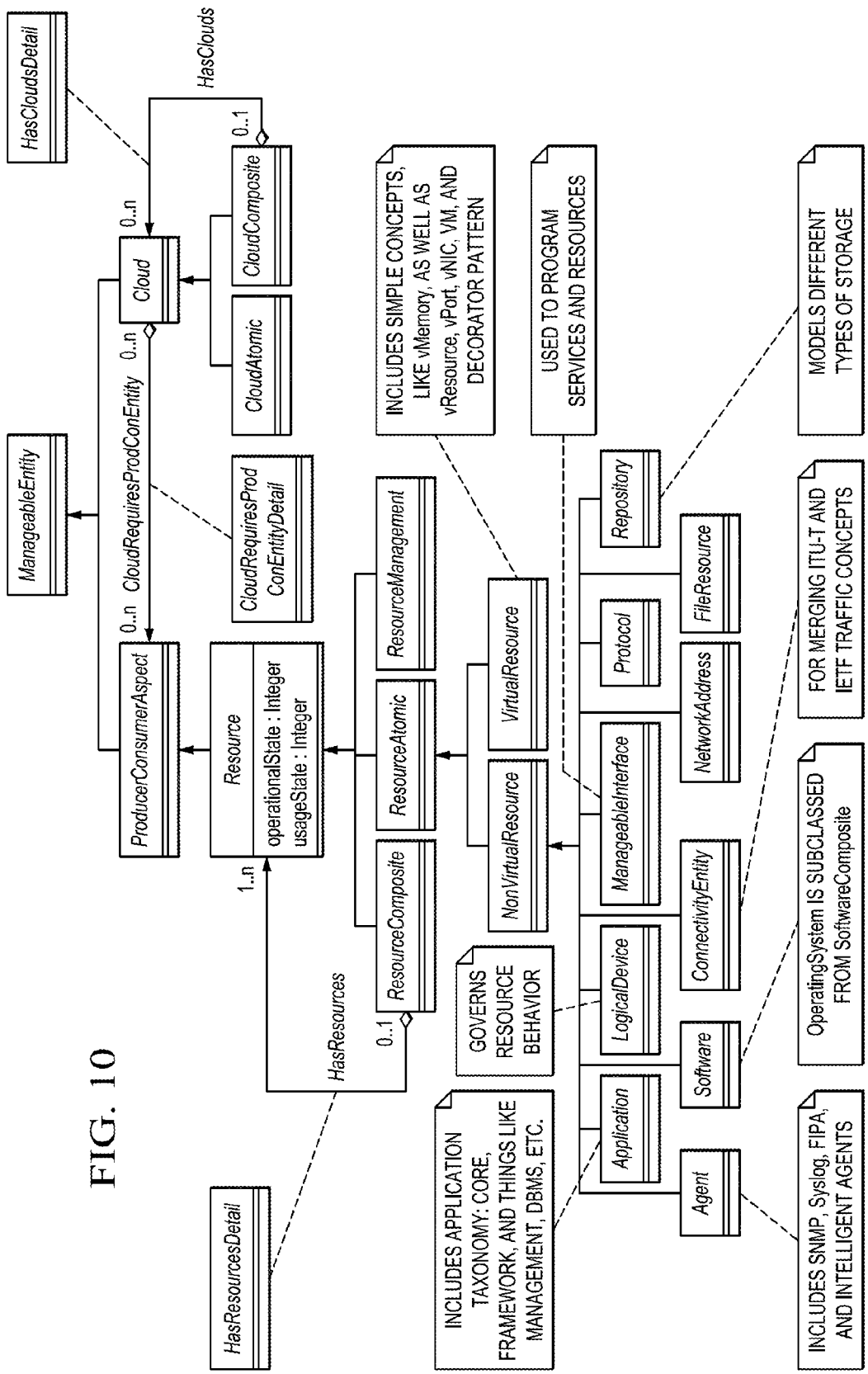
FIG. 10 illustrates a diagram for relating non-virtual resources to virtual resources using the DEN-ng model.

FIG. 10 depicts a simplified view of how virtual and non-virtual (i.e., physical, such as a device, or logical, such as software) resources are modeled in DEN-ng. This is advantageous, as it enables the messaging solution described in this disclosure to be applied to physical, logical, virtual, or a combination of resources. The ManageableEntity depicted in FIG. 10 defines the concept of an Entity that is manageable using digital mechanisms (e.g., using a protocol). Note that an Entity can be anything of interest to the managed environment that has its own distinct lifespan, such as a network device, a messaging broker, a queue, a protocol, metric data, and the like. The ProducerConsumerAspect class depicted in FIG. 10 defines the concept of a ManageableEntity class that can produce and/or consume Resources and/or Services. The Resource tree defines Resources that act as an atomic and composite object via the ResourceAtomic and ResourceComposite classes, respectively, along with a ResourceManagement class, which is used to define how Resources are managed. ResourceAtomic defines virtual and non-virtual resources. Other elements depicted on the left side of FIG. 10 provide examples of non-virtual Resources. Elements on the right side of FIG. 10 models the concept of networks implemented as a Cloud. The composite pattern is again used to represent atomic and composite Clouds.

Figure 11:
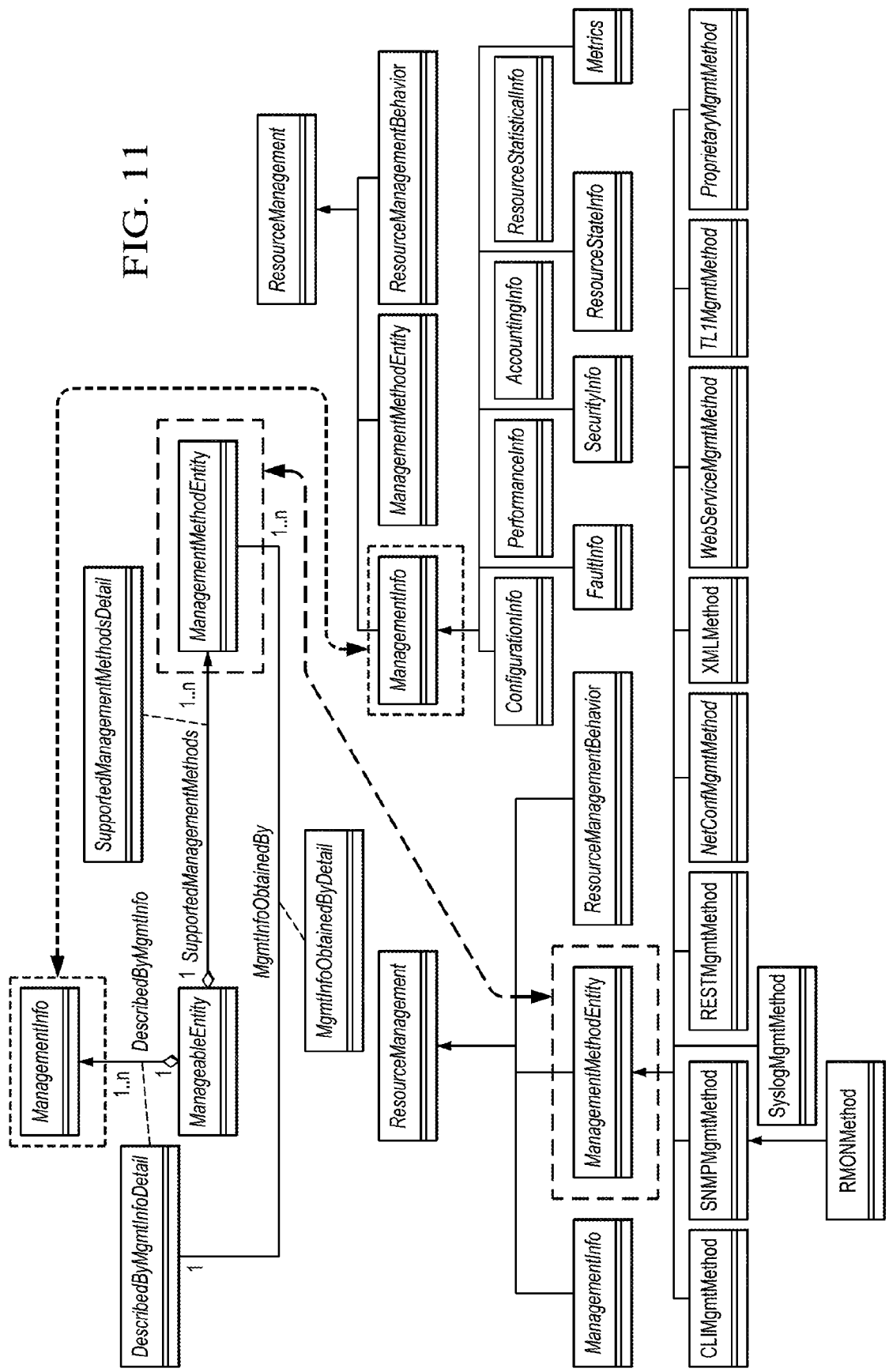
FIG. 11 illustrates a diagram for retrieving metrics from an embodiment messaging network.

FIG. 11 shows how different types of metric data can be retrieved using one or more methods. This enables this disclosure to use software patterns to standardize how different types of metric data are collected. The classes in the top-left of FIG. 11 (e.g., ManagementInfo, SupportedManagementMethodsDetail, ManagementMethodEntity, ManageableEntity, and DescribedByMgmtInfoDetail) collectively define a software pattern that enables a ManageableEntity to select the set of management protocols (represented by the ManagementMethodEntity class) that are used to get and set OAMP data (represented by the ManagementInfo class).

The ManagementMethodEntity class is repeated in the set of classes that are subclassed from the ResourceManagement class. This set of subclasses represent different types of protocols that can be used to get and set OAMP data. The ManagementInfo class is repeated on the right side of FIG. 11 (as a subclass of ResourceManagement); its subclasses represents different types of OAMP data that can be collected by an embodiment of this disclosure.

Figure 12:
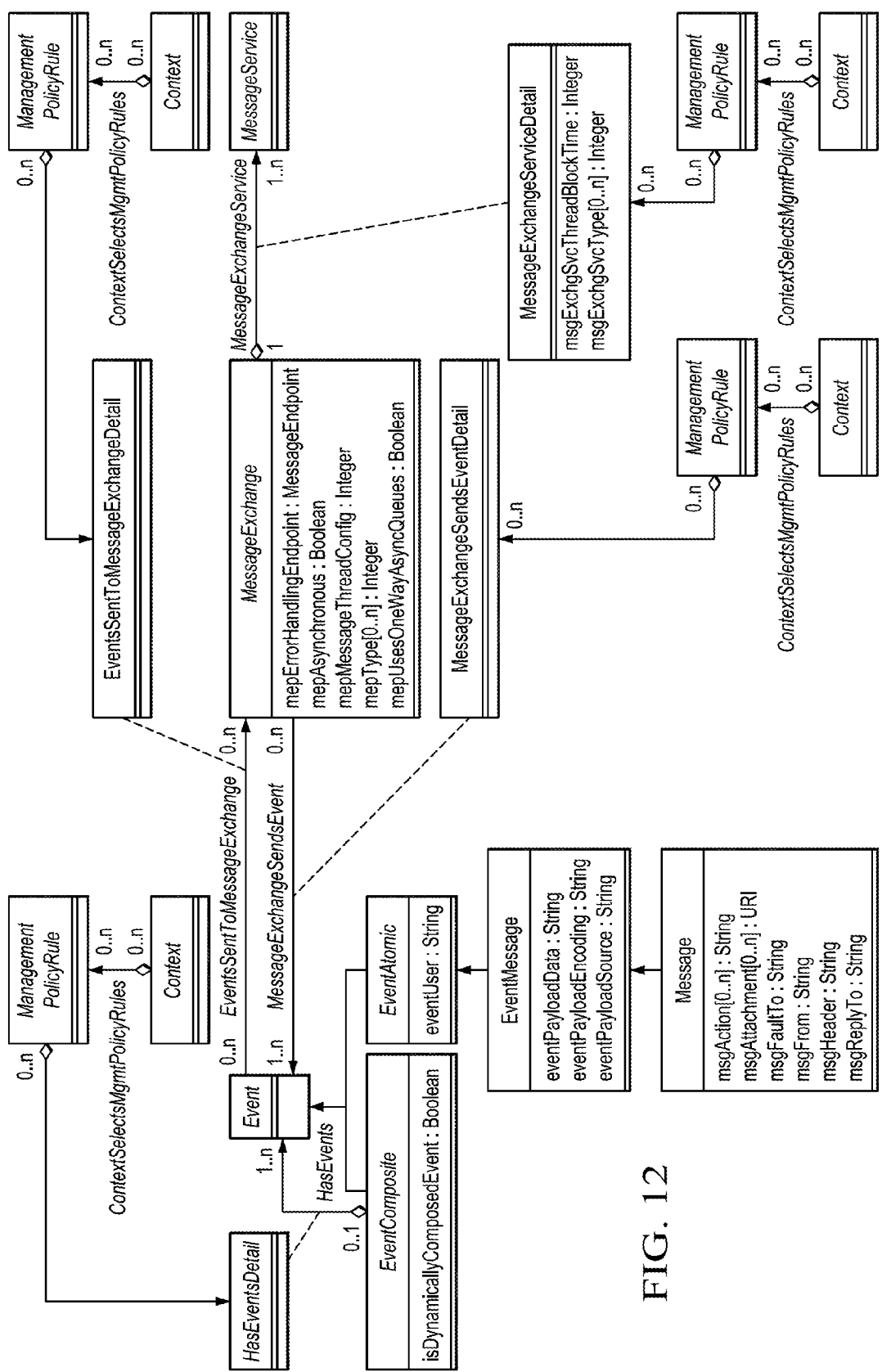
FIG. 12 illustrates a diagram for event interaction within a messaging system.

FIG. 12 describes how an event-based system interacts with a messaging system, such as one that can be used with a messaging network that is conformant with this disclosure. FIG. 12 represents how different types of Events are sent and received by a messaging system, and how context-aware policy rules (described above) can be used to control the behavior of which messages are sent, received, and operated on by the messaging system. The left side of FIG. 12 shows the composite pattern applied to the Event class, producing EventComposite and EventAtomic subclasses, which are used to represent compound and simple Events, respectively. The EventMessage class refines the concept of an EventMessage to include a payload, and a Message class refines the concept of an EventMessage to include additional fields that facilitate the routing of the Event and its payload. The EventComposite class defines one attribute, which signifies if the EventComposite is artificial (i.e., composed by this embodiment) or not.

The middle and right of FIG. 11 contains the MessageExchange and MessageService classes. These two classes represent the concept of a messaging service that uses context-aware policy rules to control which messages are sent to which ManageableEntities. This is done using a common pattern, called the Policy Pattern, in DEN-ng. Note the presence of four repeated instances of the Context, ManagementPolicyRule, and ContextSelectsMgmtPolicyRules aggregation. In each case, the ManagementPolicyRule is the source of an aggregation; in each case, the destination is an association class (HasEventsDetail, EventsSentToMessageExchangeDetail, MessageExchangeServiceDetail, and MessageExchangeSendsEvent). These four association classes control the semantics of their respective aggregations and associations in the same manner described previously. Hence, in each of these four cases, Context is used to select the appropriate set of ManagementPolicyRules to control one aspect of the embodiment of this invention. Specifically, the HasEventsDetail association class controls which Events as a function of context; the EventsSentToMessageExchangeDetail association class defines which Events generated by the system should be sent to a ManageableEntity using the messaging service as a function of context; the MessageExchangeSendEvent association class defines which Events are published to the system being managed as a function of context; the MessageExchangeServiceDetail defines which Events received by the messaging system require further processing (e.g., correlation) before they are sent to the system being managed.

Figure 13:
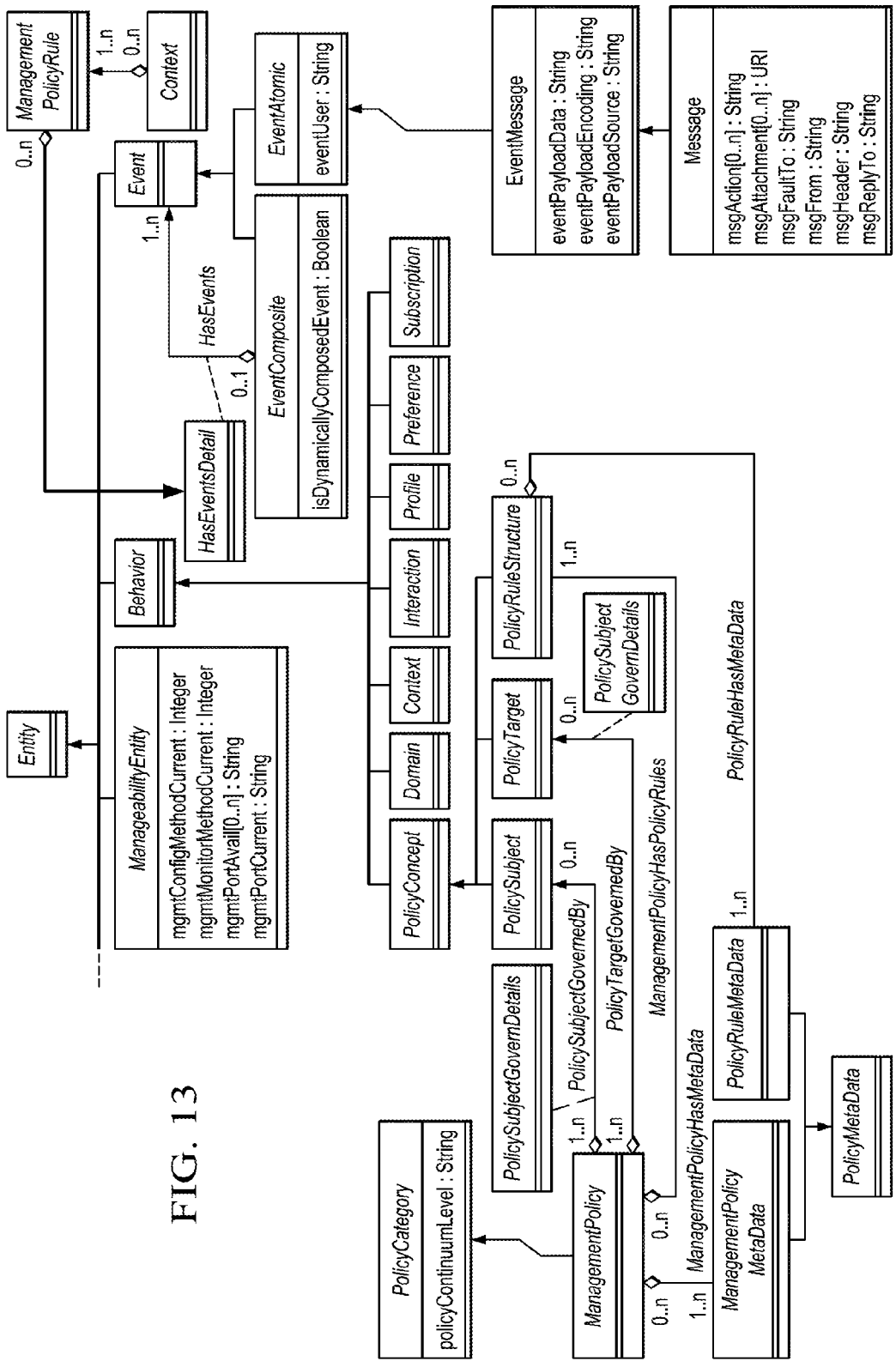
FIG. 13 illustrates a diagram for behavior based event management system.

FIG. 13 shows an embodiment DEN-ng information model that illustrates how behavior can be managed using the DEN-ng information model. The Behavior class has a number of different subclasses.

PolicyConcept is the top of the Policy class model tree. A PolicySubject is the set of entities (human or non-human) that are responsible for this Policy Rule, and a PolicyTarget is the set of entities that this Policy Rule should be applied to. For example, an administrator could be a PolicySubject, and decide that a set of Policy Rules that define how messaging networks operate. The policy rules may be sent to a subset (e.g., fewer than all) of the message brokers and/or queues in use.

PolicyRuleStructure is the superclass of different types of Policy Rules. The most common type is an "Event-Condition-Action" rule, which has the following semantics: "WHEN an Event occurs, IF the condition clause is TRUE, then execute the actions in the action clause."

A ManagementPolicy aggregates one or more PolicySubjects, one or more PolicyTargets, and one or more PolicyRules. MetaData (i.e., data that can describe as well as prescribe behavior) can be attached to any of these model elements; special subclasses of MetaData have been defined in DEN-ng to do this for different types of model elements of the Policy model tree shown in this figure. Note that the Policy Pattern can be applied uniformly to all association classes in the DEN-ng model.

FIG. 14 presents, in tabular form, a comparison of four key features that illustrate the advantageous effects of embodiments provided by this disclosure. Briefly, five commercial operations are represented in the second through sixth columns, and an embodiment operation is represented in the seventh column. While all of these operations can define and use static policy rules to configure and operate messaging services, the embodiment operation in column seven is unique in that it can realize the additional capabilities, such as dynamically choosing and adjusting the algorithm(s) used by the messaging system based on current OAMP data, using policy-based management to dynamically change the messaging system to reconfigure all or part of the system being managed based on OAMP data, and providing an extensible set of metrics that enables the system to rapidly and efficiently adjust the OAMP data being collected, as well as its analysis, to adjust to changing user needs, business goals, and environmental conditions.

FIG. 15 illustrates a block diagram of an embodiment device 1500, which may be configured to perform messaging techniques described herein. The device 1500 includes a processor 1504, a memory 1506, and a plurality of interfaces 1510, 1512, 1514, which may (or may not) be arranged as shown in FIG. 15. The processor 1504 may be any component capable of performing computations and/or other processing related tasks, and the memory 1506 may be any component capable of storing programming and/or instructions for the processor 1504. The interfaces 1510, 1512, 1514 may be any components or collections of components that allow the device 1500 to communicate with other network devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for dynamically adjusting messaging behavior, the method comprising:
    instructing a messaging broker in a communications network to provide messaging services to users in accordance with an initial set of policies during a first period;
    obtaining operations, administration, maintenance, and provisioning (OAMP) data from a messaging system being managed, and distributing the OAMP data to entities in a management system using the messaging services provided during the first period;
    obtaining an updated set of policies in accordance with the OAMP data collected, the updated set of policies reflecting the nature of the OAMP data collected; and
    instructing the messaging broker to provide messaging services between the management system and the messaging system in accordance with the updated set of policies during a second period.

2. The method of claim 1, wherein the initial set of policies are selected from a pool of policies stored in a policy rule repository of the communications network.

3. The method of claim 1, wherein obtaining the updated set of policies that reflect the nature of the OAMP data comprises:
    retrieving the OAMP data;
    examining the OAMP data to detect statistics and trends; and
    selecting the updated set of policies from a pool of policies in accordance with the detected statistics and trends.

4. The method of claim 3, wherein selecting the updated set of policies comprises selecting the updated policies on a context-aware basis.

5. The method of claim 1, wherein obtaining the updated set of policies in accordance with the OAMP data comprises:
    selecting a set of pre-defined policies from a pool of policies; and
    modifying the set of pre-defined policies in accordance with the OAMP data to obtain the updated set of policies.

6. The method of claim 1, wherein obtaining the updated set of policies in accordance with the OAMP data comprises:
    creating at least one new policy in accordance with the OAMP data, wherein the at least one new policy is included in the updated set of policies.

7. The method of claim 1, wherein the message broker remains in continuous runtime operation from the beginning of the first period to the end of the second period.

8. The method of claim 1, wherein the updated set of policies include at least one policy that is excluded from the initial set of policies, or vice versa.

9. The method of claim 8, further comprising:
recognizing a critical situation based on OAMP data generated by the messaging system during the second period; and
instructing the messaging broker to provide messaging services in accordance with a supplemental set of policies prior to expiration of the second period, thereby remedying the critical situation prior to expiration of the second period.

10. The method of claim 1, wherein the OAMP data includes OAMP data generated by the messaging system and OAMP data generated by the messaging broker, and wherein both the OAMP data generated by the messaging system and the OAMP data generated by the messaging broker are communicated to the management system.

11. The method of claim 1, wherein the OAMP data describes an operation of the messaging system and is generated by at least one messaging queue storing incoming messages of the messaging broker, outgoing messages of the messaging broker, or both.

12. The method of claim 1, wherein the OAMP data describes an operation of the messaging system and is generated by at least one messaging broker.

13. A device configured to provide message-oriented middleware functionality in a communications network, the device comprising:
a rule repository configured to store a pool of messaging policies;
a messaging broker configured to process transmitted messages into received messages in accordance with an initial set of messaging policies during a first period, the transmitted messages being communicated from sending devices, the received messages configured to be communicated to recipient devices;
a plurality of messaging queues configured to store the received messages prior to the received messages being communicated to the recipient devices; and
a context-aware policy manager configured to dynamically update the set of messaging policies in accordance with operations, administration, maintenance, and provisioning (OAMP) data generated by the messaging broker, the messaging queues, or both during the first period.

14. The device of claim 13, wherein the messaging broker is configured to process transmitted messages into received messages in accordance with the updated set of messaging policies during a second period that follows the first period, and wherein the communications network is configured to remain in continuous runtime operation from the beginning of the first period to the end of the second period.

15. The device of claim 13, wherein the updated set of policies include at least one policy that is excluded from the initial set of policies.

16. The device of claim 13, wherein the initial set of policies include at least one policy that is excluded from the updated set of policies.

17. The device of claim 13, wherein the OAMP data includes OAMP data is generated by a messaging system being managed during the first period.

18. The device of claim 13, wherein the OAMP data includes OAMP data generated by messaging queues storing, during the first period, incoming messages of the messaging broker, outgoing messages of the messaging broker, or both.

19. An apparatus comprising:
a processor; and
a computer readable storage medium storing programming for execution by the processor, the programming including instructions to:
instruct a messaging broker in a communications network to provide messaging services to users in accordance with an initial set of policies during a first period;
obtain operations, administration, maintenance, and provisioning (OAMP) data resulting from the messaging services provided during the first period;
obtain an updated set of policies in accordance with the OAMP data collected, the updated set of policies reflecting the nature of the OAMP data collected; and
instruct the messaging broker to provide messaging services to the users in accordance with the updated set of policies during a second period.

20. The apparatus of claim 19, wherein the initial set of policies are selected from a pool of policies stored in a rule repository of the communications network.

21. The apparatus of claim 19, wherein the instructions to obtain the updated set of policies in accordance with the OAMP data includes instructions to:
create at least one new policy in accordance with the OAMP data, wherein the at least one new policy is included in the updated set of policies.

22. The apparatus of claim 19, wherein the updated set of policies include at least one policy that is excluded from the initial set of policies, or vice versa.

* * * * *